United States Patent [19]

Fleury

[11] 4,352,301
[45] Oct. 5, 1982

[54] LUBRICATION PUMP & FILTER FOR AXLE ASSEMBLIES

[75] Inventor: Edward Fleury, Headingly, Canada

[73] Assignee: Versatile Cornat Corporation, Vancouver, Canada

[21] Appl. No.: 130,441

[22] Filed: Mar. 14, 1980

[51] Int. Cl.³ .................. F16H 57/04; F16H 1/40; F01M 9/10

[52] U.S. Cl. .................. 74/467; 74/710; 74/713; 184/6.12

[58] Field of Search .............. 184/6.12; 417/569, 570; 74/467, 710, 713

[56] References Cited

U.S. PATENT DOCUMENTS

| | | |
|---|---|---|
| 2,041,468 | 5/1936 | Grubbs .................. 417/569 |
| 2,168,850 | 8/1939 | Towler et al. .......... 417/569 |
| 2,263,657 | 11/1941 | Towler et al. ........ 417/569 X |
| 2,908,351 | 10/1959 | Daley, Jr. ............. 184/6.12 |
| 2,968,190 | 1/1961 | Orr ....................... 74/467 |
| 3,430,577 | 3/1969 | Wagner ................. 417/570 X |
| 3,545,568 | 12/1970 | Lacoste ................. 74/467 |
| 3,738,452 | 6/1973 | Hausinger ............. 184/6.12 |
| 3,788,426 | 1/1974 | Hull, Jr. ................ 184/6.12 |
| 3,987,873 | 10/1976 | Ruberte ................ 74/467 |
| 4,235,307 | 11/1980 | Browning et al. ...... 74/467 |

FOREIGN PATENT DOCUMENTS 1091588 10/1960 Fed. Rep. of Germany ..... 184/6.12

Primary Examiner—Leslie Braun
Attorney, Agent, or Firm—Wenderoth, Lind & Ponack

[57] ABSTRACT

A small pump is connected externally of the differential housing of an axle assembly, picks up oil from the housing and pumps it through an external filter. This cools and cleans the oil and the oil may be routed to the outer bearing areas of the half shafts for lubrication. The oil flows by gravity through the axle casing back to the differential housing and, if desired, an oil cooler may be incorporated within the system.

5 Claims, 3 Drawing Figures

LUBRICATION PUMP & FILTER FOR AXLE ASSEMBLIES

BACKGROUND OF THE INVENTION

This invention relates to new and useful improvements in lubricating pumps and filters, particularly designed for axle assemblies.

Axle assemblies such as those used by heavy equipment such as tractors and the like, normally include a drive shaft, a differential assembly and half shafts extending from each side of the differential assembly operatively connected to the hub of the wheels which are driven by the half shafts. In heavy duty equipment, particularly in relatively warm weather, the oil contained within the differential housing sometimes becomes overheated and foams with detrimental results to the differential assembly.

It is desirable that means to be provided not only to cool this oil when necessary, but also to filter same and under certain circumstances, direct some of this oil to the outer ends of the half shafts not only to assist in the cooling of the oil, but also to supply lubrication to the end bearing assemblies and the end or outer gear drive to the hub.

SUMMARY OF THE INVENTION

The present invention is for use in an axle assembly which includes a differential assembly, a differential assembly housing for said differential assembly adapted to hold a supply of lubricating oil, half shaft casings extending from each side of said housing, half shafts within said casings and bearing means operatively mounting the outer end portions of each of said half shafts for rotation within said casings. The improvement comprises in combination, an oil pump mounted on said axle assembly, oil intake means on said pump, an inlet tube extending from said oil intake means to said oil supply within said housing, oil outlet means on said pump, oil filter means connected to said outlet means, conduit means operatively extending from the outlet of said oil filter means to adjacent said bearings of said half shafts to convey oil, under pressure, from said filter means to said bearings and cam means on one of said half shafts operatively connected to drive said oil pump, said oil pump, said oil intake means, said oil outlet, and said filter means being removably mounted on said axle assembly externally thereof.

DESCRIPTION OF THE DRAWINGS

An embodiment of the invention will now be described, by way of example only, with reference to the accompanying drawings in which.

DETAILED DESCRIPTION

Figure 1:
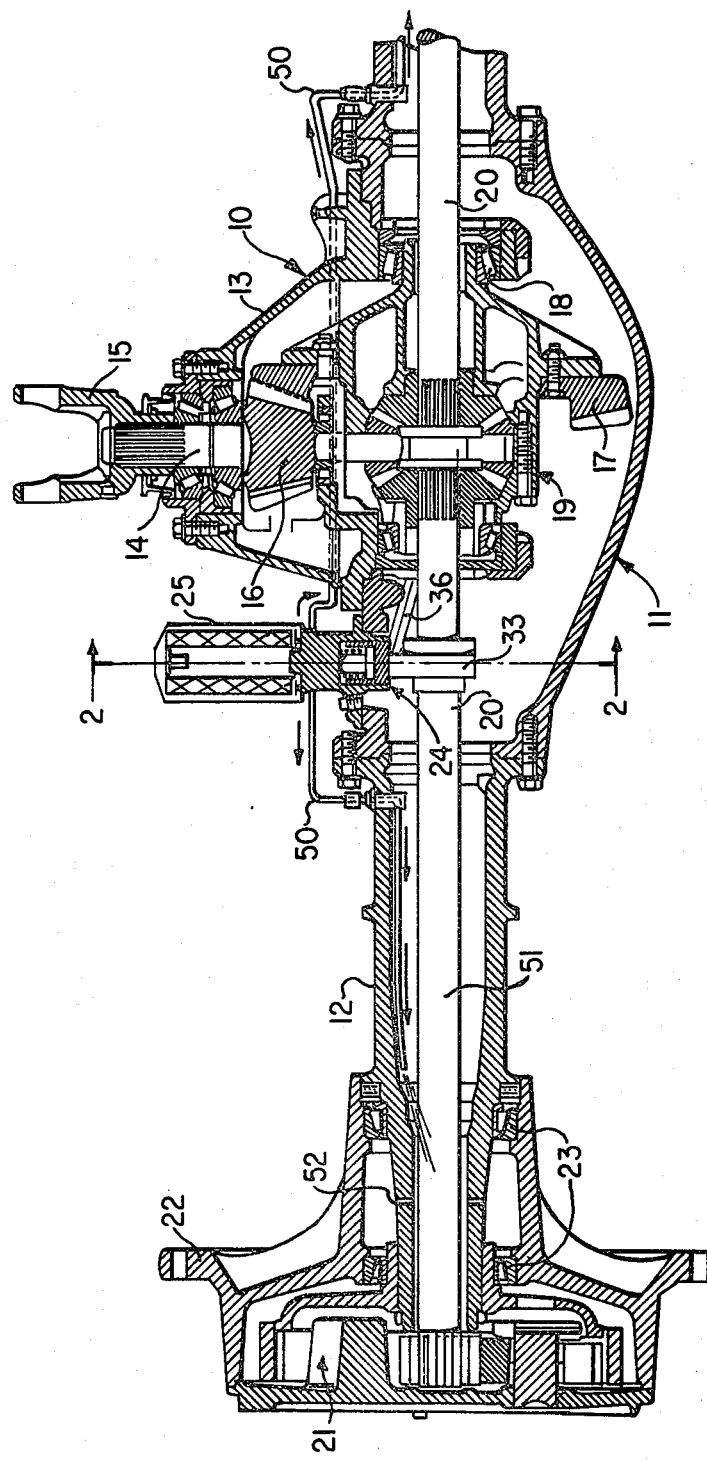
FIG. 1 is a longitudinal cross sectional view of an axle assembly with the invention incorporated therein, taken substantially along the line 1—1 of FIG. 2.
Figure 3:
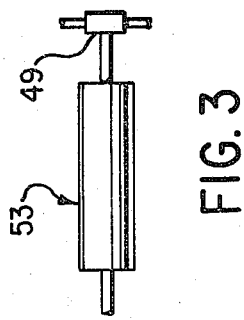
FIG. 3 is a fragmentary schematic view showing how an oil cooler may be incorporated within the invention.
Figure 2:
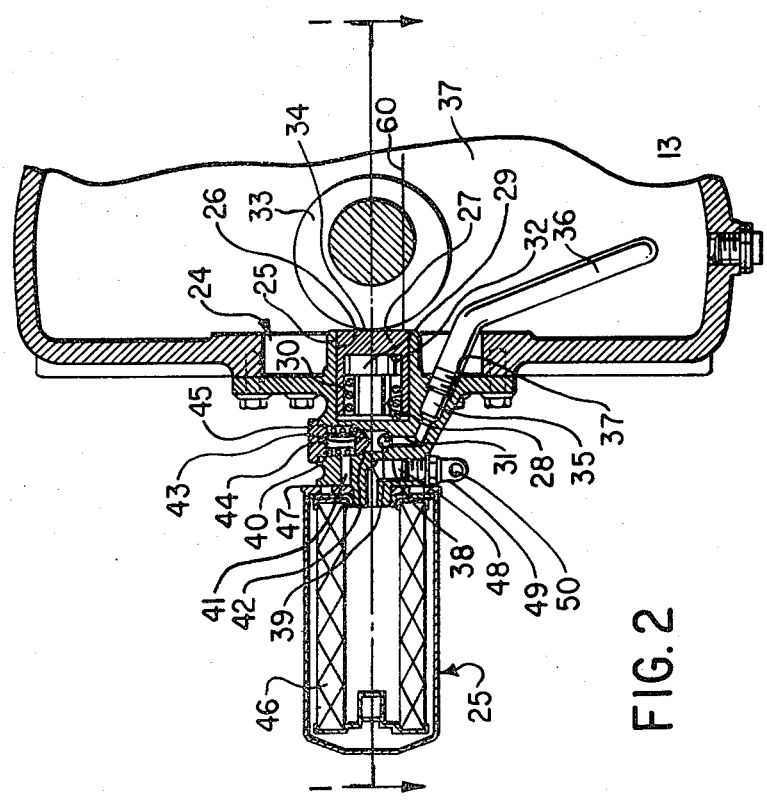
FIG. 2 is a vertical cross sectional view of FIG. 1 taken substantially along the line 2—2 of FIG. 1.

Proceeding therefore to describe the invention in detail, reference should first be made to FIG. 1 which shows a top plan sectional view of part of an axle assembly collectively designated 10. This axle assembly includes a differential assembly collectively designated 11 with half shaft or axle casings 12 being bolted to the differential assembly 11 and extending outwardly one upon each side thereof.

The differential assembly 11 includes a housing 13 into which a drive shaft 14 extends from a universal joint connection 15, it being understood that this connection 15 is operatively connected to a source of power (not illustrated).

Situated upon the inner end of drive shaft 14 and within the housing 13, is a pinion 16 meshing with a crown wheel 17 and being supported in the usual manner, within bearings 18. A conventional differential assembly 19 is situated within housing 13 and operatively connected to the crown wheel 17 in the usual way. Half shafts 20 extend one upon each side of the differential assembly 19 in the usual manner, through the half shaft or axle casings 12 and terminate in the reduction gear assembly collectively designated 21 upon the distal ends of the drive shaft 20, said gear assembly being operated connected to a hub 22 in the usual manner which in turn is supported within sets of bearings 23 on the outer reduced end of the axle or half shaft casing 12, all of which is conventional.

Situated on one side of the housing 13 is an oil pump collectively designated 24, having a conventional oil filter 25 detachably secured upon the outer end thereof. The oil pump 24 consists of a housing 25' within which is formed a cylinder 26 having a piston 27 reciprocal therein, incoporating at least one piston ring 28 as clearly shown.

A cylindrical spacer 29 extends axially into the upper end of the cylinder and a compression spring 30 surrounds this spacer and reacts between the upper end 31 of the cylinder and the upper side 32 of the piston normally urging the piston downwardly or towards the interior of the housing 13. Means are provided to reciprocate this piston within the cylinder, said means taking the form of an eccentric cam 33 secured to one of the half shafts or drive shafts 20, as clearly illustrated, and this engages the underside 34 of the piston which is maintained in contact with the periphery of the cam by means of the aforementioned compression spring 30.

An oil inlet 35 is formed through the housing 25' and is connected to a suction pipe or tube 36 which extends into the housing 13 and into the oil supply 37 contained therein, reference character 60 illustrating the oil level.

This inlet 35 communicates with the upper side of the piston through a drilling 37' extending through the spacer 32 and a one-way valve in the form of a ball check valve 38 is seated upon a valve seat 39 at the inner end of the oil inlet 35 and is positioned so that when the piston is moved downwardly with respect to the housing, suction is created in the inlet unseating the ball 38 and drawing oil through the tube 36 and through the inlet 35 passed the ball valve 38 to the space above the piston 27. A substantially cylindrical outlet valve 40 is provided within an oil outlet 41 also within the oil pump housing 25, said cylindrical valve being provided with a conical seating 42 normally engaging an outlet seat 43 within the oil outlet 41 and in communication with the area above the piston 27. A compression spring 44 reacts between this outlet valve 40 and a sealing plug 45 within the housing and normally maintains it upon the seat 43 thus sealing off the outlet 41. However, when the pisxon moves upwardly on the other stroke, the ball 38 is engaged with its seating and oil under pressure displaces the outlet valve 40 so that oil then passes through the outlet 41 and into a filter element 46 secured to an upper extension 47 of the oil pump housing and situated externally of the axle assembly as clearly illustrated. This oil filter cartridge 46 is conventional and is replaceable. Reciprocation of the piston within the cylinder of the pump, causes oil to be drawn from the housing 13 and pumped through the filter element and back to a discharge conduit 48 situated within the housing extension 47.

In one embodiment illustrated, a T-connection 49 is secured to this oil outlet 48 and conduits or pipes 50 extend from each side of the T-connection, through the wall of the casing 12 and then along towards the outer end portions 51 of the half shaft assemblies so that oil is sprayed upon the ends of the half shafts as clearly illustrated schematically in FIG. 1. Small drillings 52 extend through the casing 12 between the bearing assemblies 23 so that oil is fed to these bearing assemblies whereupon it makes its way downwardly through the gear assemblies 21 and then back into the casing 12 to drain back to the housing 13 by gravity.

Due to the fact that oil is constantly being pumped to these areas, oil will return to the housing 13 not only providing lubrication to the bearings 23 and to the gear assemblies 21, but also circulating the oil from the housing 13 and through the filter cartridge 46 thus not only cleansing the oil but also cooling same, particularly if the ambient temperature is lower than the temperature of the oil passing through the filter element.

If necessary, a conventional oil cooler shown schematically by reference character 53 may be provided between the oil outlet 48 and the T-connection 49 to further cool the oil, particularly under heavy duty conditions and in conditions of relatively high ambient temperatures.

Both the cleansing and cooling of the oil improves the conditions under which the differential assembly operates and, when fed to the outer ends of the half shafts, improves the performance of the support bearings 23 and the gear assemblies 21.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

The embodiments of the invention in which an exclusive property or privilege is claimed are defined as follows:

1. In an axle assembly which includes a differential assembly, a differential assembly housing for said differential assembly adapted to hold a supply of lubricating oil, half shaft casings extending from each side of said housing, half shafts within said casings, and bearing means operatively mounting the outer end portions of each of said half shafts for rotation within said casings; the improvement comprising the combination: an oil pump mounted on said axle assembly, oil intake means on said pump, an inlet tube extending from said oil intake means to said oil supply within said housing, oil outlet means on said pump, oil filter means connected to said outlet means, conduit means operatively extending from the outlet of said oil filter means to adjacent said bearings of said half shafts to convey oil, under pressure, from said filter means to said bearings, and cam means on one of said half shafts operatively connected to drive said oil pump, said oil pump, said oil intake means, said oil outlet and said filter means being removably mounted on said axle assembly externally thereof.

2. The invention according to claim 1 in which said oil pump includes a housing, a cylinder formed in said housing, a piston reciprocal in said cylinder, spring means normally urging said piston to the innermost position within said cylinder, an intake valve in said oil intake means, and an outlet valve in said oil outlet means, said intake means and said outlet means being operatively connected to said cylinder above said piston.

3. The invention according to claim 2 or 1 in which said oil filter means is detachable.

4. In an axle assembly which includes a differential assembly, a differential assembly housing for said differential assembly adapted to hold a supply of lubricating oil, half shaft casings extending from each side of said housing, half shafts within said casings and bearings means operatively mounting the outer end portions of each of said half shafts for rotation within said casings; the improvement comprising in combination: an oil pump mounted on said axle assembly, said oil pump including a housing, a cylinder formed in said housing and a piston reciprocal in said cylinder, oil intake means on said oil pump, an intake valve in said oil intake means, an inlet tube extending from said oil intake means to said oil supply within said housing, oil outlet means on said pump, an outlet valve in said oil outlet means, said intake means and said outlet means being operatively connected to said cylinder outwardly of said piston, oil filter means connected to said outlet means, conduit means operatively extending from the outlet of said oil fitler means to adjacent said bearings of said half shafts to convey oil, under pressure, from said filter means to said bearings, and means to drive said oil pump, said oil pump, said oil intake means, said oil outlet and said filter means being removably mounted on said axle assembly externally thereof.

5. The invention according to claim 2, 1 or 4 which further includes an oil cooler located externally of said axle assembly operatively connected to said oil pump.

* * * * *